(12) United States Patent
Kontos

(10) Patent No.: US 6,254,184 B1
(45) Date of Patent: Jul. 3, 2001

(54) HARNESS/RESTRAINT SYSTEM FOR A CHILD CAR SEAT

(76) Inventor: George Vlasios Kontos, 3909 Lake Des Allemands Dr., Harvey, LA (US) 70058

(*) Notice: Subject to any disclaimer, the term of this patent is extended or adjusted under 35 U.S.C. 154(b) by 0 days.

(21) Appl. No.: 09/527,253

(22) Filed: Mar. 17, 2000

Related U.S. Application Data

(60) Provisional application No. 60/159,113, filed on Oct. 13, 1999.

(51) Int. Cl.[7] .................................................. A47C 1/08
(52) U.S. Cl. ..................................... 297/256.15; 297/465
(58) Field of Search ........................... 297/250.1, 256.15, 297/464, 465, 467, 487, 488, 485

(56) References Cited

U.S. PATENT DOCUMENTS

| 5,730,498 | * | 3/1998 | Hanson et al. . |
| 6,007,156 | * | 12/1999 | Chang . |
| 6,036,260 | * | 3/2000 | Mullen . |

* cited by examiner

Primary Examiner—Milton Nelson, Jr.
(74) Attorney, Agent, or Firm—Shawn David Sentilles

(57) ABSTRACT

A harness or restraint system is provided that comprises a vest-like member designed to be used as a passive restraint system to protect a child passenger. The vest-like member encapsulates fully the front portion of a child car seat such that the child's torso is restrained, while providing openings that allow the free movement of the head and limbs.

13 Claims, 1 Drawing Sheet

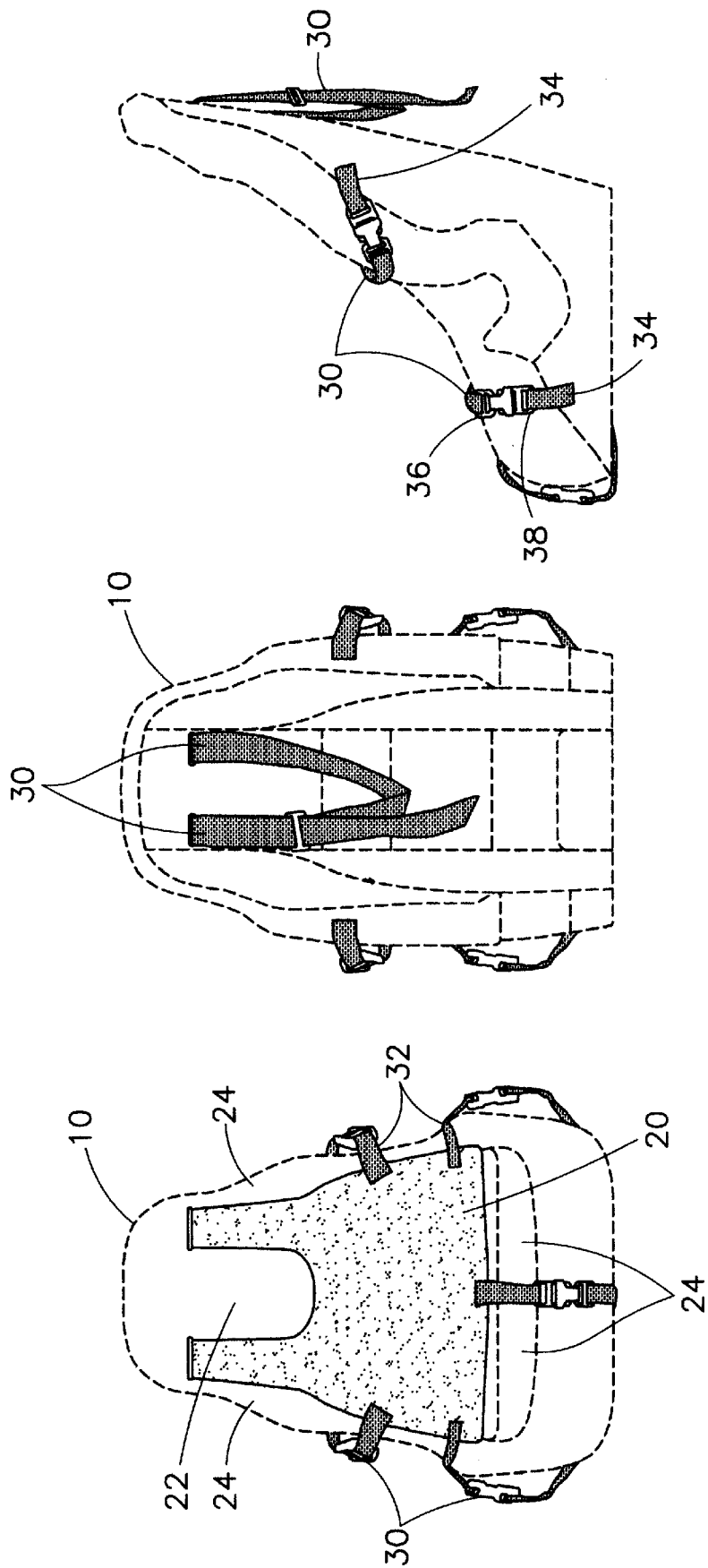

HARNESS/RESTRAINT SYSTEM FOR A CHILD CAR SEAT

This application claims benefit to U.S. Provisional 60/159,113 filed Oct. 13, 1999.

FIELD OF INVENTION

The present invention relates generally to child car seats, and more specifically to the harness or restraint used to secure a child in the car seat.

BACKGROUND OF THE INVENTION

With the recent passage of legislation, both on the state and federal levels, that requires the use of car seats for all infants and small children, use of such car seats has increased dramatically. Although the primary purpose of child car seats is to restrain the child in the event of a vehicular incident, there is, or should be, a secondary purpose of these seats.

There are numerous occurrences each year where children who have been secured in a car seat have experienced discomfort from the pressure of the harness or restraining straps against their small and fragile bodies. This discomfort usually leads the child to cry or complain and is frequently sufficient to induce older children to attempt to escape from the seat, sometimes while the vehicle is in motion. There are also cases where children have been bruised or severely abraded following a vehicular incident because of the limited area of their body that is directly in contact with the restraining straps.

Although every child car seat currently available must pass the standards of the Federal Motor Vehicles Regulations, and they satisfactorily do restrain the child in the event of a vehicular incident, none of the currently available car seats addresses completely the issue of the true comfort of the child car seat occupant.

Various child car seats have been devised to restrain children in a vehicle. Some of these seats have rigid barriers in front of the child along with the use of harness or restraining straps, as shown in U.S. Pat. No. 5,664,833 issued Sep. 9, 1997 to Celestina-Krevh et al. Other child car seats merely have as their design the harness or restraining straps shown in U.S. Pat. No. 5,125,965 issued Jun. 16, 1992 to Skold et al.

Another example of a harness or restraint system is shown in U.S. Pat. No. 3,321,247 issued May 23, 1967 to Dillender, where there is a total harness system virtually strapping a child to a regular automobile car seat to preclude movement without involving a specialized child car seat. Still another system is shown in U.S. Pat. No. 4,674,800 issued Jun. 23, 1987 to Ensign, where a harness-like vestment is used to envelop the child in multiple cocoon-like surroundings in a regular car seat, again to preclude movement without involving a specialized child car seat.

While these examples are not exhaustive, they illustrate the developments in the field of child car seats and the harnessing or restraint of child passengers. Even though these devices work satisfactorily to restrain children, there nonetheless still exists a need for a harness or restraint system for use with a child car seat that is effective both to protect the child during a vehicular incident and also to provide a greater level of comfort to the child while secured in the seat.

SUMMARY OF THE INVENTION

It is therefore the principal object of the present invention to provide a child car seat harness or restraint system that provides the federally mandated level of protection to children.

It is another object of the present invention to provide a child car seat harness or restraint system that increases the level of passenger comfort sufficient to reduce or eliminate the desire of the passenger child to escape the child car seat, particularly while the vehicle is in motion.

It is a further object of the present invention to provide a child car seat harness or restraint system that increases the level of safely afforded to child passengers by decreasing the pressure per square inch that is exerted on the passenger child's body during a vehicular incident as compared with currently available harnesses or restraints.

It is an additional object of the present invention to provide a child car seat harness or restraint system that is fully detachable from the car seat for ease of use and cleaning.

These and other objects of the present invention are achieved by a harness or restraint system for use with a child car seat, the system comprising a vest-like member that is connectable to or attachable by a series of adjustable connection elements to the child car seat.

Other aspects and advantages of the present invention will be apparent upon consideration of the following detailed description hereof which includes numerous illustrative examples of the practice of the invention, with reference being made to the following figures:

DESCRIPTION OF THE FIGURES

FIG. 1 shows a front view of a child car seat provided with the harness or restraint system of the present invention.

FIG. 2 shows a rear view of a child car seat provided with the harness or restraint system of the present invention.

FIG. 3 shows a side view of a child car seat provided with the harness or restraint system of the present invention.

DETAILED DESCRIPTION OF THE INVENTION

The harness or restraint system of the present invention comprises a vest-like member 20 that is designed to be used as a passive restraint system to protect a child passenger. Vest-like member 20 is designed so that it encapsulates fully the front portion of a child car seat 10, as shown in FIG. 1. Vest-like member 20 is further designed so that when member 20 is deployed there are provided openings 22 and 24, allowing the free movement of the head and limbs, respectively, while the child's torso is restrained.

It is intended that vest-like member 20 be constructed from a fabric or fabric-like material. In one embodiment, the material allows for the passage of air so as to avoid an excessive build-up of heat against the covered portion of the child. It is also contemplated that the material can be washable. Any material may be used, however, provided that the principal object of the invention is maintained.

Vest-like member 20 is capable of being attached or connected to or secured about a child car seat 10 by a plurality of adjustable connective straps 30, as shown in FIGS. 1 and 3. Connective straps 30 are constructed so as to have a first attachment element 32 permanently attached to vest-like member 20, as by stitching or other permanent fastening means, and a corresponding second attachment element 34 either likewise permanently attached to child car seat 10. In an alternate embodiment, corresponding second attachment element 34 may be part of a security harness that is deployed about child car seat 10.

It is contemplated that first attachment element 32 and second attachment element 34 be provided with mating attachment means elements 36 and 38, respectively, such that engagement of mating attachment means elements 36 and 38 will join first attachment element 32 and second attachment element 34 such that a child may be retained within car seat 10. Any conventional mating attachment means may be employed, provided, however, that such temporary attachment is capable of withstanding the force that would be exerted on the connection during a vehicular incident by contact of a child with vest-like member 20. It is intended that the selected attachment means be difficult for a child to disengage, such that separation of first attachment element 32 from second attachment element 34 is only achieved by a third party, such as a supervising adult.

It is further intended that the length of connective straps 30 may be adjusted to best fit vest-like member 20 about the child to be retained in child car seat 10. With the child placed in car seat 10 and vest-like member 20 securely fastened thereto, the adult user of car seat 10 is then able firmly to secure the child by means of adjusting the length of connective straps 30. Decreasing the length of connective straps 30 results in vest-like member 20 being pulled closer to child car seat 10, consequently reducing the space therebetween and more securely retaining a child within car seat 10.

Certain objects of the present invention are met by reducing the amount of movement allowed to the child retained within car seat 10. First, the child is harnessed or restrained in such a fashion as to satisfy the standard of safety established by the Federal Motor Vehicle Regulations, thus effectively protecting the child in the event of a vehicular incident. Second, by distributing the force exerted by a child on the harness/restraint system of the present invention over the area of vest-like member 20, the return force exerted by the harness/restraint system on the child's body is significantly decreased, thereby reducing the likelihood of impact injuries to the child. Third, by more completely enveloping the child secured within car seat 10, as compared with conventional retention means, the harness/restraint system of the present invention is more comfortable to the child, thereby reducing the desire of the child to free himself from car seat 10.

In operation, two methods of use are contemplated. First, it is envisioned that a child be positioned in car seat 10 and the vest-like member 20 then be secured to car seat 10 by engagement of first attachment elements 32 and second attachment elements 34. For convenience, it is contemplated that one or more of connective straps 30 may be left connected to reduce the number of connections that need to be made after the child is positioned within car seat 10.

A second means of operation contemplated requires that connection straps 30 be adjusted toward their longest lengths and that a child then be positioned within car seat 10 and under vest-like member 20. The lengths of connection straps 30 may then be adjusted such that the child is securely retained within car seat 10.

In addition, a combination of these methods may be used, as where after a child is removed from car seat 10 some straps are left connected and adjusted, others are left connected and unadjusted, others are left unconnected, but adjusted, and/or still others are left unconnected and unadjusted.

While the present invention has been described in terms of specific methods and constructions, it is understood that variations and modifications will occur to those skilled in the art upon consideration of the present invention. Numerous modifications and variations in the invention as described in the above illustrative examples are expected to occur to those skilled in the art and, consequently, only such limitations as appear in the appended claims should be placed thereon. Accordingly, it is intended in the appended claims to cover all such equivalent variations which come within the scope of the invention as claimed.

What is claimed is:

1. A harness/restraint system for use in retaining a child in a child car seat, the child car seat having a seat portion and a back portion disposed therefrom at an ergonomically comfortable angle, the child car seat having a plurality of seat attachment straps, each of the seat attachment straps having a mating attachment means on an end thereof, a pair of the seat attachment straps extending from opposing sides of the back portion, a pair of the seat attachment straps extending from opposing sides of the seat portion, and one of the straps extending from a front center of the seat portion, comprising:

a vest member formed from a unibody sheet of flexible material, said vest member having a torso portion and a pair of shoulder portions extending upward from an upper edge of said torso portion, said vest member sized to substantially cover a torso and pelvic region of the child, a pair of shoulder portion fastening straps, each of said shoulder portion fastening straps attached to an upper end of one of said shoulder portions of said vest member, an adjustment means joining said shoulder portion fastening straps to one another such that said fastening straps may be slidably adjusted relative to one another to thereby secure said shoulder portions to the back portion of the car seat;

a pair of back straps extending from opposing sides of said torso portion of said vest member, said back straps being closer to said upper edge of said torso portion than a lower edge of said torso portion of said vest member such that said back straps may be used to secure said vest member to the back portion of the car seat;

a pair of seat straps extending from opposing sides of said torso portion of said vest member, said seat straps being closer to said lower edge than said upper edge of said vest member such that said seat straps may be used to secure said vest member to the seat portion of the car seat;

a leg strap extending downward from a lower edge of said torso portion of said vest member such that said leg strap may be used to secure said vest member to the seat portion of the car seat; and each of said back straps, seat straps, and leg strap having a mating attachment means on an end thereof for selectively attaching said straps to the seat attachment straps of the car seat via said attachment means.

2. The harness/restraint system, as claimed in claim 1, wherein said vest member is constructed and arranged so as not to interfere with respiration of the child.

3. The harness/restraint system, as claimed in claim 1, wherein said vest member is constructed and arranged so as to distribute force exerted by said system on the child across said vest member.

4. The harness/restraint system, as claimed in claim 1, wherein each of said leg strap, said seat straps, and said back straps may be adjusted in length.

5. The harness/restraint system of claim 1, wherein said flexible material of said vest member is permeable to passage of air so as to avoid excess buildup of heat against the child.

6. A method of restraining a child in a child car seat, the method comprising the steps of:
   providing a child car seat having a seat portion and a back portion disposed therefrom at an ergonomically comfortable angle, said back portion having a pair of strap receiving slots adjacent an upper end thereof, said child car seat having a plurality of seat attachment straps, each of said seat attachment straps having a mating attachment means on an end thereof, a pair of said seat attachment straps extending from opposing sides of said back portion, a pair of said seat attachment straps extending from opposing sides of said seat portion, and one of said seat attachment straps extending from a front center of said seat portion;
   providing a vest member formed from a unibody sheet of flexible material, said vest member having a torso portion and a pair of shoulder portions extending upward from an upper edge of said torso portion, said vest member sized to substantially cover a torso and pelvic region of said child, said vest member including:
      a pair of shoulder portion fastening straps, each of said shoulder portion fastening straps attached to an upper end of one of said shoulder portions of said vest member, an adjustment means joining said shoulder portion fastening straps to one another such that said fastening straps may be slidably adjusted relative to one another to thereby secure said shoulder portions to said back portion of said car seat;
      a pair of back straps extending from opposing sides of said torso portion of said vest member, said back straps being closer to said upper edge of said torso portion than a lower edge of said torso portion of said vest member such that said back straps may be used to secure said vest member to said back portion of said car seat;
      a pair of seat straps extending from opposing sides of said torso portion of said vest member, said seat straps being closer to said lower edge than said upper edge of said vest member such that said seat straps may be used to secure said vest member to said seat portion of said car seat;
      a leg strap attachment element extending downward from a lower edge of said torso portion of said vest member such that said leg strap may be used to secure said vest member to said seat portion of said car seat;
      each of said back straps, seat straps, and leg strap having a mating attachment means on an end thereof for selectively attaching said straps to said seat attachment straps of said car seat;
      placing said child in said child car seat
      threading each of said shoulder portion fastening straps through one of each of said strap receiving slots of said car seat and slidably adjusting said shoulder portion fastening straps relative to one another via said adjustment means to thereby secure said shoulder portions to said back portion of said car seat;
      attaching each of said back straps of said vest member to one of each of said seat attachment straps extending from opposing sides of said back portion via said mating attachment means;
      attaching each of said seat straps of said vest member to one of each of said seat attachment straps extending from opposing sides of said seat portion via said mating attachment means; and
      attaching said leg strap of said vest member to said seat attachment strap extending from a front center of said seat portion.

7. The method, as claimed in claim 6, wherein said connection elements remain connected until disconnected by direct action thereon.

8. The method of claim 6, wherein said seat attachment straps are provided by a security harness that is deployed about said car seat.

9. The method, as claimed in claim 6, further comprising the steps of disconnecting at least one of said back straps, seat straps or leg strap from said seat attachment straps, and removing said child from said car seat.

10. The method, as claimed in claim 6, wherein said straps may be adjusted in length.

11. The method, as claimed in claim 10, wherein said straps are adjusted to secure said child within said car seat and then readjusted to release said child from said car seat.

12. A harness/restraint system for use in retaining a child in a child car seat, the child car seat having a seat portion and a back portion disposed therefrom at an ergonomically comfortable angle, comprising:
   a security harness, said security harness comprising a plurality of seat attachment straps, each of said seat attachment straps having a mating attachment means on an end thereof, said security harness configured to be deployed about the car seat such that a pair of said seat attachment straps extend from opposing sides of the back portion of the car seat, such that a pair of said seat attachment straps extend from opposing sides of the seat portion of the car seat, and such that one of said straps extends from a front center of the seat portion of the car seat;
   a vest member formed from a unibody sheet of flexible material, said vest member having a torso portion and a pair of shoulder portions extending upward from an upper edge of said torso portion, said vest member sized to substantially cover a torso and pelvic region of the child;
   a pair of shoulder portion fastening straps, each of said shoulder portion fastening straps attached to an upper end of one of said shoulder portions of said vest member, an adjustment means joining said shoulder portion fastening straps to one another such that said fastening straps may be slidably adjusted relative to one another to thereby secure said shoulder portions to the back portion of the car seat;
   a pair of back straps extending from opposing sides of said torso portion of said vest member, said back straps being closer to said upper edge of said torso portion than a lower edge of said torso portion of said vest member such that said back straps may be used to secure said vest member to the back portion of the car seat;
   a pair of seat straps extending from opposing sides of said torso portion of said vest member, said seat straps being closer to said lower edge than said upper edge of said vest member such that said seat straps may be used to secure said vest member to the seat portion of the car seat;
   a leg strap extending downward from a lower edge of said torso portion of said vest member such that said leg strap may be used to secure said vest member to the seat portion of the car seat; and
   each of said back straps, seat straps, and leg strap having a mating attachment means on an end thereof for selectively attaching said straps to the seat attachment straps of the car seat via said attachment means.

13. The harness/restraint system of claim 12, wherein said flexible material of said vest member is permeable to passage of air so as to avoid excess buildup of heat against the child.

* * * * *